US012732673B2

(12) United States Patent
McGuire et al.

(10) Patent No.: US 12,732,673 B2
(45) Date of Patent: Sep. 8, 2026

(54) SYSTEM AND METHOD FOR GENERATING DESCRIPTIVE METADATA

(71) Applicant: ThinkAnalytics Ltd., Glasgow (GB)

(72) Inventors: Christopher McGuire, Glasgow (GB); Peter Docherty, Glasgow (GB); Rose McKenna, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 0 days.

(21) Appl. No.: 18/906,989

(22) Filed: Oct. 4, 2024

(65) Prior Publication Data

US 2026/0101093 A1 Apr. 9, 2026

(51) Int. Cl.
*H04N 21/84* (2011.01)

(52) U.S. Cl.
CPC .................................. *H04N 21/84* (2013.01)

(58) Field of Classification Search
CPC ........... H04N 21/6581; H04N 21/4345; H04N 21/8166; H04N 21/83555; H04N 21/84
See application file for complete search history.

(56) References Cited

U.S. PATENT DOCUMENTS 6,567,814 B1 5/2003 Bankier et al.
7,805,129 B1 9/2010 Issa et al.
9,699,491 B1 7/2017 Docherty et al.
9,756,390 B1 9/2017 Docherty et al.
9,906,837 B1 2/2018 Docherty et al.
9,973,797 B1 5/2018 Docherty et al.
10,091,555 B1 10/2018 Docherty et al.
10,289,739 B1 5/2019 Docherty et al.
10,356,035 B1 7/2019 Gravino et al.
10,412,454 B2 9/2019 Docherty et al.
11,212,584 B2 12/2021 Docherty et al.
11,343,573 B2 5/2022 Docherty et al.
2003/0106064 A1 6/2003 Plourde
2004/0088723 A1 * 5/2004 Ma .................. H04N 21/25891 725/19
2007/0157222 A1 7/2007 Cordray et al.
2008/0304812 A1 12/2008 Jin
2008/0313127 A1 * 12/2008 Wong .................... G06F 16/437 707/E17.014
2009/0064226 A1 * 3/2009 Lin ........................ H04N 21/47 725/40
2010/0005492 A1 1/2010 Takano et al.
2010/0070507 A1 3/2010 Mori
2011/0243529 A1 10/2011 Oryoji et al.
(Continued)

FOREIGN PATENT DOCUMENTS

EP 1 317 143 A1 6/2003
EP 2 207 348 A2 7/2010
(Continued)

*Primary Examiner* — Jason Salce
(74) *Attorney, Agent, or Firm* — Foley & Lardner LLP

(57) ABSTRACT

A computer-implemented method and system for generating a synopsis for a content item comprising: obtaining user data for at least one user and/or associated metadata, wherein the user data and/or associated metadata is based on user activity for the at least one user; receiving content metadata and/or other content information for the content item; generating or otherwise obtaining a synopsis for the content item based on the obtained content information and based on at least some of said obtained user data.

22 Claims, 6 Drawing Sheets

(56) References Cited

U.S. PATENT DOCUMENTS

| | | | | |
|---|---|---|---|---|
| 2013/0268973 | A1* | 10/2013 | Archibong | G06Q 50/01 709/204 |
| 2014/0149344 | A1 | 5/2014 | Pudipeddi et al. | |
| 2014/0279756 | A1 | 9/2014 | Whitman | |
| 2015/0082330 | A1 | 3/2015 | Yun et al. | |
| 2015/0100987 | A1 | 4/2015 | Whitman et al. | |
| 2015/0143436 | A1* | 5/2015 | Gibbon | H04N 21/26603 725/88 |
| 2015/0269488 | A1 | 9/2015 | Galai et al. | |
| 2016/0323658 | A1* | 11/2016 | Richardson | G11B 27/28 |
| 2017/0311015 | A1 | 10/2017 | Docherty et al. | |
| 2020/0252690 | A1 | 8/2020 | Docherty et al. | |
| 2020/0329217 | A1* | 10/2020 | Sun | H04N 5/147 |
| 2022/0415360 | A1* | 12/2022 | Dong | G11B 27/28 |
| 2024/0048821 | A1* | 2/2024 | Cain | H04N 21/4884 |
| 2024/0129602 | A1* | 4/2024 | Hamsa | G06F 40/279 |

FOREIGN PATENT DOCUMENTS

| | | | |
|---|---|---|---|
| GB | 2 574 581 | A | 12/2019 |
| WO | WO-01/15449 | A1 | 3/2001 |
| WO | WO-02/27526 | A1 | 4/2002 |
| WO | WO-2008/042242 | A2 | 4/2008 |
| WO | WO-2013/186061 | A1 | 12/2013 |
| WO | WO-2021/130834 | A1 | 7/2021 |

* cited by examiner

Table 1 – CRE learning tables

| Section Number | DB Table name |
| --- | --- |
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

FIGURE 2

SYSTEM AND METHOD FOR GENERATING DESCRIPTIVE METADATA

BACKGROUND

The present disclosure relates to a system and method for use in content recommendation systems, such as but not limited to electronic program guides and video on demand catalogs. In examples, the content recommendation system generate descriptive metadata for content items including a customized synopsis.

Developments in technology mean that users are able to access content via a wide array of different mechanisms, and via a wide array of different sources. For example, television channels, radio stations, video-on-demand and other streaming services, social media and other internet content sources provide a vast array of content available to a user.

By providing a large volume of content, content distribution platforms can cater to a large range of different user preferences and provide content previously unseen to a user to hold the user's interest. However, the large volume of available content gives rise to challenges in making it easy for users to identify, navigate and select content.

As part of the content metadata provided by, for example, a content distribution system or a middleware operator, human readable text, in the form of a synopsis is provided. It is known to provide a single universal synopsis for each content items for all users associated with a content recommendation system.

SUMMARY OF THE INVENTION

In accordance with a first aspect, there is provided a computer-implemented method for generating a synopsis for a content item comprising: obtaining user data for at least one user and/or associated metadata, wherein the user data and/or associated metadata is based on user activity for the at least one user; receiving content metadata and/or other content information for the content item; generating or otherwise obtaining a synopsis for the content item based on the obtained content information and based on at least some of said obtained user data.

The generated synopsis may comprise a customized synopsis for said at least one user. The generated synopsis may comprise a personalized synopsis. The generation of the synopsis may use at least one item of metadata generated based on at least one of: user activity history, user engagement data and/or other user data.

The content metadata may comprise an initial synopsis and the generating or otherwise obtaining of the synopsis is based on the initial synopsis and at least some of the obtained user data. The user data may be stored in a user profile and synopsis may be generated based on the user profile. The method may comprise obtaining the user profile for the user and generating the synopsis based on the user profile.

The content metadata may comprise enriched content metadata. The content metadata may comprises corrected or supplemented metadata. The method may comprise obtaining initial metadata for a content item and enriching the metadata. Enriching metadata may comprise correcting or supplementing metadata. The method may comprise generating the synopsis based on the enriched metadata. The method may comprise matching the metadata for the content item to an ontology of metadata terms and at least one of enriching, correcting or supplementing the metadata based on the ontology.

The method may comprise receiving a call request, for example, in accordance with a protocol, for example, an application programming interface protocol for a synopsis based on the content metadata and user data. The method may further comprise transmitting the API call to a server or further networked processor. The method may further comprises generating the synopsis based on the API call.

The content information may comprise an initial synopsis for the content item and wherein generating the synopsis comprises modifying and/or re-generating the initial synopsis based on the obtained user data and/or the received content metadata.

The method may form part of a content recommendation process, the content recommendation process comprising: receiving a request for one or more content recommendations; obtaining content information for a plurality of content items; generating a content recommendation for a set of content items based on at least the content information, optionally based on the user data; wherein the generating or otherwise obtaining of the synopsis is performed for each content item of the set of content items.

The synopsis may be generated and stored at a first time, for example, during or in response to a content recommendation request and retrieved from storage at a second time, for example, in response to a user interaction with a content selection interface or other user interface. The method may further comprise storing the synopsis at the first time for retrieval at the second time.

The generation of the synopsis for the content item may be performed in response to the generation of a content recommendation for said content item. The obtained content information comprises the content metadata for the content item.

Generating the synopsis may comprise applying a machine learning derived model to at least part of the content metadata, optionally an initial synopsis, and at least part of the user data wherein the machine learning model is configured to output the synopsis.

The method may comprise obtaining user device information, for example, information relating to the size of a display or a display window, and generating the synopsis based on said user device information.

The method may further comprise determining the maximum size of the generated synopsis that can fit into the display or display window and using the determined maximum size as part of a prompt for the synopsis.

The method may further comprise providing the content metadata and at least part of the user data as input to a pre-determined machine learning model, for example a generative text or language model. The model may comprises a Markov based model, a Recurrent Neural Network, a Long Short Term Memory or large language model, for example, a transformer-based language model.

The method may further comprise selecting one or more parameters for the model, wherein the one or more parameters comprises at least one of: a requested language and a desired length of synopsis.

The machine learning model may comprise a natural language processing model.

The user data and/or associated metadata may be represented as a feature vector or other data structure and wherein the method comprises generating a prompt or other input for a model based on said feature vector or other data structure and said content metadata, optionally said initial synopsis.

Generating the synopsis may comprise packaging at least part of said user data and/or associated content metadata, said content metadata and one or more selected parameters for a synopsis generator.

The method may comprise performing a filtering and/or selection process on the user data and/or associated metadata and wherein the generating of the synopsis is based on the filtered and/or selected user data and/or associated metadata.

The user vector may comprise entries representing metadata tags, labels and/or keywords and associated weights The content metadata may be obtained from a first data source without the use of user data and/or associated metadata and/or wherein the content metadata, optionally initial synopsis is independent of user data user activity.

The method may comprise storing the generated synopsis. The content metadata for the content item may not comprise or may be independent of user data and/or user activity data. The content metadata for the content item may comprise or form part of or be derived from 3rd party data. The user data and/or associated metadata may comprise first party data.

The method may comprise analyzing the generated synopsis to determine a suitability of the generated synopsis.

Generating or otherwise obtaining the synopsis may comprise evaluating a set of pre-generated synopses for a suitable or closest match based on said user data and/or associated metadata.

The generating or obtaining of the synopsis may comprise retrieving said suitable or closest match based on said evaluation and/or generating a synopsis in the absence of a suitable or closest match.

The content metadata may comprise an initial synopsis, wherein the initial synopsis is selected from set of initial synopses for the content item based on said user data. The method may comprise storing the generated synopses together with associated user data to be retrieved later.

The synopsis may be generated based on data of a content distribution system or middleware operator that does not comprise 3rd party data.

The method may comprise identifying a group of users for at least one user from a plurality of groups based on said user data and wherein the generation of the synopsis comprises is based on said identification of group. The method may comprise identifying a group of users associated with at least one user from a plurality of groups based on said user data and wherein the generation of the synopsis comprises is based on said identification of group.

The set of pre-determined synopses may comprise synopsis associated with or corresponding to each group. The identification of the group may be based on user interests and/or previous user activity. The identification of the group may be based on at least one common or matched metadata.

The first party data may comprise or be based on user actions performed in relation to their selection, viewing and other actions in relation to content. The content may be television content.

The method may further comprise obtaining the first party metadata from a first source and obtaining the user data and/or associated content metadata from a second source.

The method may comprise performing generating the synopsis in response to a request from a content selection interface module, a content recommendation The method may further comprises displaying the generated synopsis as part of a content selection interface and/or other user interface. The method may further comprise producing audio for the generated synopsis.

The synopsis may be generated in response to a pre-selection user interaction with the user interface, wherein the pre-selection user interaction comprises:

- selecting content from a group of content or a related group of content;
- scrolling through content in a group of content or a related group of content;
- hovering a cursor for greater than a threshold period over a group of content or a related group of content; and/or
- pausing scrolling for greater than a threshold period through groups of content whilst a group of content or a related group of content is displayed on a user interface;
- clicking on or otherwise selecting content that is in a group of content or related group of content from a list of search results;
- interacting with other content in the group of content items;

The pre-selection user interaction comprises a user interaction representing a selection of a group of the plurality of groups of content and wherein the method comprises generating the synopsis for each content item of a group of content items in response to a user interaction with said group in the user selection interface The method may further comprise identifying portions of the generated text that are offensive and re-generating and/or modifying the text based on said identified portions.

The method may comprise using a third party text generator to generate the synopsis, and evaluating the output of the generated synopsis.

The method may comprise identification of the text based on a restriction, for example, an age restriction for the content item.

The method may comprise obtaining initial metadata data from a content distribution system or a middleware operator and enriching said initial metadata and generating the synopsis based on the enriched metadata. The method may comprise obtaining or collecting user data based on initial metadata data from a content distribution system or a middleware operator, forming the user profile by enriching said initial metadata and generating the synopsis based on the enriched metadata of the user profile.

In accordance with a second aspect, there is provided a system comprising processing circuitry configured to: obtain user data for at least one user and/or associated metadata, wherein the user data and/or associated metadata is based on user activity for the at least one user; receive content metadata for the content item, generate or otherwise obtain a synopsis for the content item based on the obtained content metadata and based on at least some of said obtained user data.

In accordance with a third aspect there is provided a non-transitory computer-readable medium that comprises computer-readable instructions that are executable to: obtain user data for at least one user and/or associated metadata, wherein the user data and/or associated metadata is based on user activity for the at least one user; receive content metadata for the content item, generate or otherwise obtaining a synopsis for the content item based on the obtained content metadata and based on at least some of said obtained user data.

Features of one aspect may be provided as features of another aspect, in any appropriate combination. For example, method features may be provided as system features and vice versa.

BRIEF DESCRIPTION OF THE DRAWINGS

Various aspects of the invention will now be described by way of example only, and with reference to the accompanying drawings, of which:

FIG. 2 is representation of certain database learning tables used by the system of FIG. 1;

DETAILED DESCRIPTION

Figure 1:
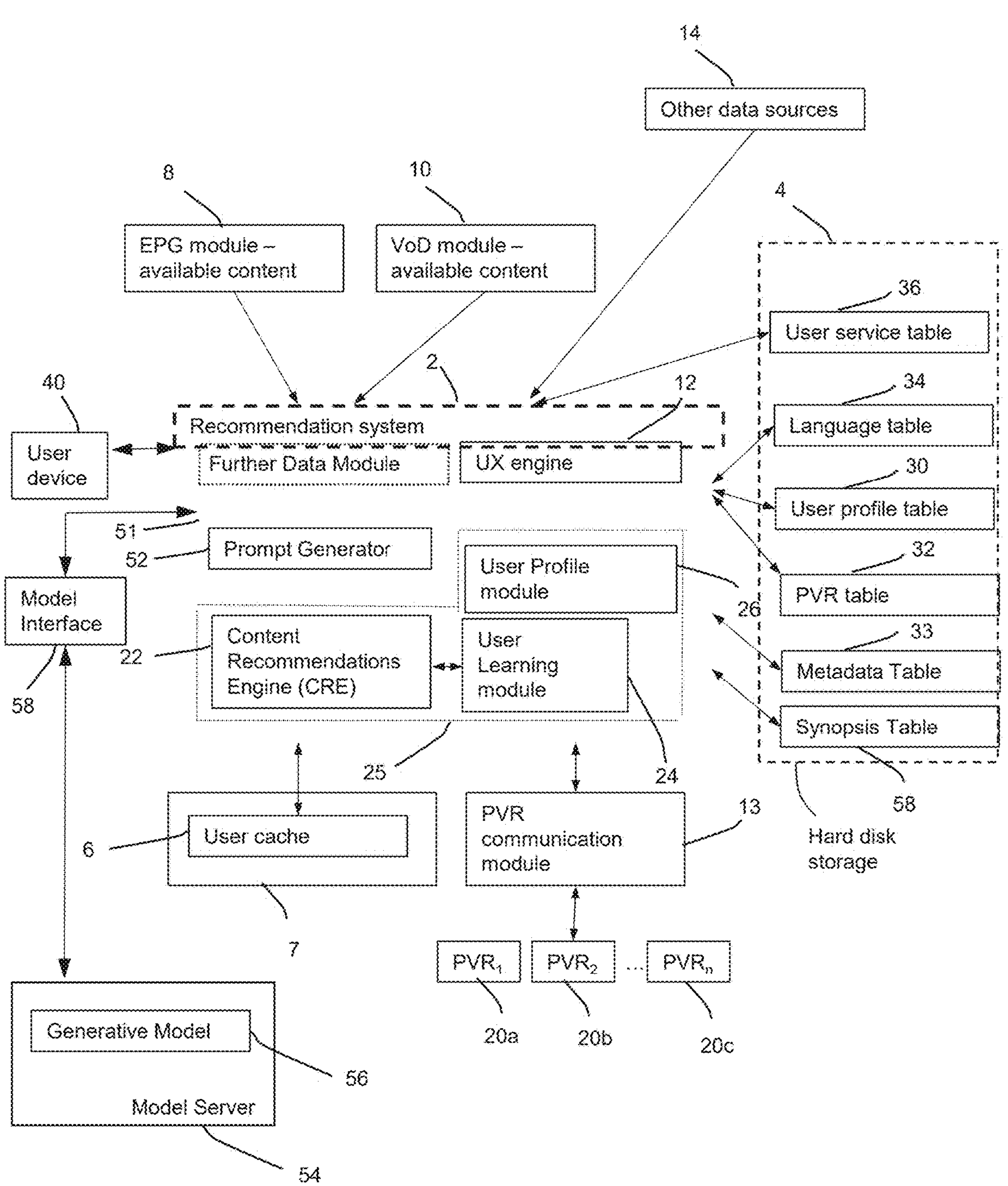
FIG. 1 is a schematic diagram of a digital content recommendation system.

In TV systems, or other systems for provision of content to a user, each service provider may have thousands, tens or hundreds of thousands, or millions of customers, wherein each customer is unique and may have different viewing habits and preferences. Furthermore, in order to accommodate the range of tastes and interests of such a large customer base, and to keep those customer's interest, the service provider will often provide an extensive range of different content.

The content distribution system may provide metadata for a particular item of content. In particular, the metadata includes a human-readable description, also known as a synopsis, describing the content item. It is known to provide a single universal synopsis for each content items for all users associated with a content recommendation system.

The synopsis of a show is important for several reasons. The synopsis provides a brief overview of the show's premise, characters, and plot, allowing potential viewers to determine whether it is of interest to them. The synopsis may also provide convenience in that it offers a quick and easy way to learn about a show without having to watch it. This is particularly useful for those who have limited time and need to make informed decisions about what to watch. Further a synopsis can help clarify the show's content, tone, and themes, making it easier for viewers to understand and contextualize what they are watching. Viewers are still reliant on generic descriptions of content made for mass appeal and often lacking in quality. Overall, a synopsis is a crucial tool for helping people discover new shows and make informed decisions about what to watch.

The content distribution system provides metadata for a particular item of content. The metadata typically includes a human-readable description of the content item, also referred to as a synopsis, for presenting to the user, for example, via a content selection interface. In such systems, the synopsis provided to every user may be the same. As a result, certain users may be less inclined to engage with the content based on the synopsis. To promote user engagement with content, it may be desirable to provide a system for providing alternative synopsis.

The embodiments described below relate to a method of generating a customized synopsis for a content item. In particular, the generation of the synopsis is based on obtained user data for one or more users. The user data is representative of previous user engagement with the content.

The provision of customized synopsis may provide a number of advantages. For example, a personalized synopsis may drive engagement by offering a more personalized and relevant viewing experience. Firstly, by considering a user's watch history and preferences, the personalized synopsis can highlight content that is more likely to appeal to them, increasing the likelihood that they will engage with it. In addition, the synopsis can provide a brief and engaging summary of the show, making it more appealing to the user and increasing their likelihood of watching it. By offering a tailored and relevant viewing experience, a personalized synopsis can increase user engagement and satisfaction, making it a valuable tool for driving usage and loyalty. The personalized synopsis created by combining the metadata tags captured from the viewers profiles such as themes, moods, settings, subjects. These tags are used to elevate the synopsis to resonate with the viewer In addition to an improved user experience, advantages for the operation of the content recommendation system can be also be derived by providing customized synopsis. For example, by increasing the likelihood of engagement, the time spent by a user scrolling through a content selection interface is reduced thus reducing the number of content recommendations required for a user and resources required by a content selection interface. In other words, a user is more likely to engage with a recommendation based on the customized synopsis thus offering advantages in terms of system performance.

FIG. 1 shows a schematic diagram of content recommendation system according to an embodiment, which is operable to generate content recommendations for users based on first party data in the form of, for example, user actions performed in relation to their selection, viewing and other actions in relation to TV content provided by a TV distribution system, and/or in relation to other content. The content recommendation system is configured to perform one or more content recommendation methods. As part of the content recommendation system, the system has additional features and modules for providing an additional level of customization. In particular, a further data module is provided as described in the following.

The system in the embodiment of FIG. 1 comprises a content recommendation system 2 that comprises a content recommendation engine (CRE) or module 22 and linked to a first storage resource in the form of a hard disk storage device 4, which is used to store various user data. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

The content recommendation engine (CRE) 22 can apply a set of processes, to determine, in real time, content recommendations for a user 205 based on user data and available content.

Figure 3:
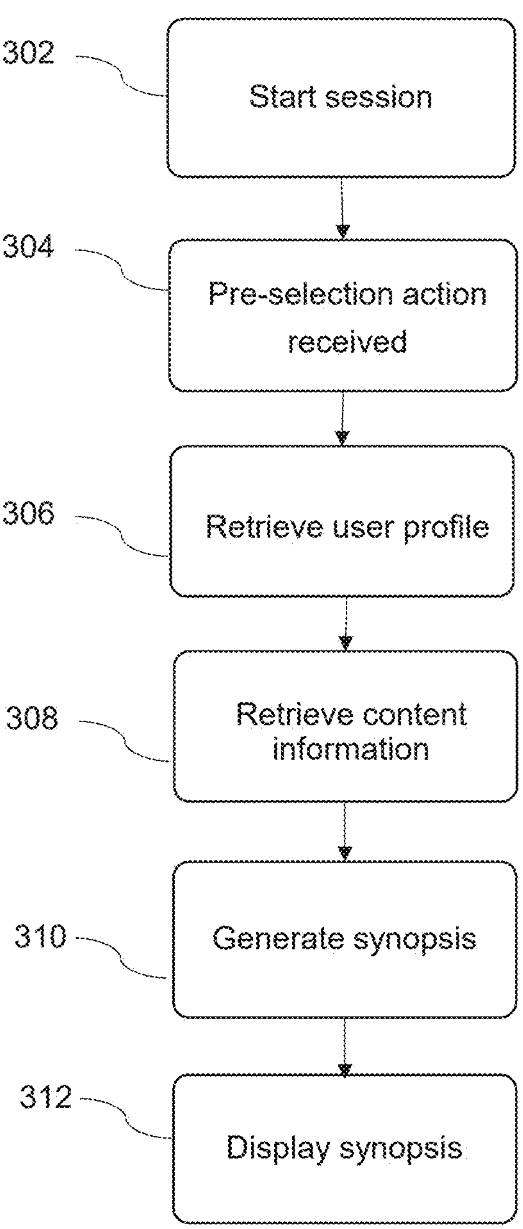
FIG. 3 is an overview of a method of a workflow including generating descriptive metadata, in particular, a synopsis, for a user in accordance with an embodiment.

FIG. 1 shows a schematic diagram of a system 1 that comprises a user experience (UX) engine 12 for configuring user content selection interfaces that allow users 205 (see FIGS. 2 and 3) to navigate and select content from a content service provider (210, also shown in FIGS. 2 and 3). In particular, the user experience (UX) engine 12 can be used to provide customized user content selection interfaces that are customized or otherwise specifically configured to a specific user 205 or group of users 205. The customization can comprise, for example, customizing the order in which groups of content is presented to a user 205 or groups of users 205 so that groups of content more likely to be of interest to the user 205 are presented earlier, or in preference to groups of content that are less likely to be of interest to that user 205.

In the example of FIG. 1, the user experience (UX) engine 12 is provided as part of a more general recommendation system 2 that comprises a content recommendation engine (CRE) 22 that can apply a set of processes to determine, in real time, content recommendations for a user 205 based on user data and available content. This arrangement can be beneficial as there may be some cross-over in the data utilized such that the UX engine 12 can in some examples share or otherwise leverage data used by the CRE 22, which can minimize data storage and other services required to operate both systems. However, the disclosure is not limited to this arrangement and in other examples the UX engine 12 can be provided as a dedicated stand-alone system or as part of a content provider's user interface system or in another suitable component of a content provision system or associated support system.

The UX engine 12 is configured to take into account previous interactions that the user 205 has had with user content selection interfaces. These could include interactions the user 205 has had with the user content selection interface that the system 1 is currently looking to configure and/or with other user content selection interfaces. Beneficially, such user interactions may comprise first party data in the form of, for example, user actions performed in relation to their selection, viewing and other actions in relation to content such as but not limited to TV content provided by a TV distribution system or other types of content.

FIG. 1 depicts a further data module 51. In the present embodiment, the further data module 51 has a prompt generator 52. The prompt generator 52 is provided for generating prompts for the generative model. The further data module may be configured to generate further data, in particular, descriptive text data based on user data and/or content metadata. The further data module may be configured to generate metadata for one or more content items and/or further data for one or more users.

The further data module 51 is configured to communication with one or more data sources. In the system of FIG. 1, the further data module 51 is configured to communicate with one or more remote servers 54 to access a generative model 56. While the present embodiment depicts a generative machine learning model, other machine learning or artificial intelligence derived models may be provided for generating synopses. It will be understood that communication between the further data module 50 and the generative model 56 on remote server 54 is via a communication interface, represented by model interface 58.

In the following embodiments, the further data module 51 is configured to generate a synopsis for a content item based on user data collected for a user and/or based on content metadata. As described elsewhere, the EPG module 8 and the VOD module 10 obtain information concerning available content from the content sources, for example, a TV service operator or other content service operator. In some embodiments, as part of the content information, an initial synopsis is provided. In such embodiments, the initial synopsis may be obtained by the further data module 51 from a number of different data sources. In some embodiments, the initial synopsis is obtained from the same source as the content (the EPG module or VOD module). It will be understood that providing the initial synopsis is optional and that, in further embodiments, a customized synopsis may be generated without the providing the initial synopsis.

In the present embodiment, the further data module 51 is depicted as a separate module to the recommendation system 25, however, it will be understood that the further metadata module may be provide as part of the recommendation service or as part of the UX engine. In particular, in some embodiment, a synopsis may be generated during a recommendation procedure executed by the CRE. In some embodiments, a synopsis may be generated during a content selection process controlled by the UX engine.

In the present embodiment, the model server 54 hosts a machine learning model for generating textual information. The machine learning model may be a machine learning or artificial intelligence model for generating textual information. In the present embodiment, the machine learning model is a generative language model 56. In some embodiments the machine learning model is a generative AI large language model. The machine learning model may be a Markov process, Recurrent Neural Network, Long Short Term Memory or large language model, for example, a transformer-based language model. In some embodiments the machine learning model is a generative AI large language model. Access to the generative model 56 is provided by the model interface 58. The model interface 58 may comprise one or more APIs (Application Programming Interfaces). The model interface 58 is configured to transmit language prompts and requested model parameters packaged as one or more requests to the model server 54. The prompt is provided to the model 56 and the model is configured to output text, in the following embodiments, a synopsis for a content item. The model interface 58 communicates the results to further data module 51. In some embodiments, the model is an example of a synopsis generator.

The content recommendation engine (CRE) 22 in this example is provided as part of an affinity profile generation system, which is operable to generate affinity profiles for users 205 based on first party data in the form of, for example, user actions performed in relation to their selection, viewing and other actions in relation to TV content provided by a TV distribution system, and/or in relation to other content. The recommendation system 2 in the embodiment of FIG. 1 is also able to provide content recommendations to users as well as generating affinity profiles. Content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated in full herein by reference. However, as noted above, this is an optional arrangement, and the UX engine 12 need not be provided as part of such a recommendation system 2 and can be provided as a stand-alone system or as part of a system with other functionality.

Some example modes of operation are described below in relation to PVRs associated with users, but content may be provided or accessible via any suitable devices, for example set-top boxes, smartphones, PCs or tablets or any other suitable content delivery mechanism.

As discussed further below, the recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The recommendation system 2 is also linked to sources of information concerning available content, in this case an EPG module 8 and a Video-on-Demand (VOD) module which provide information concerning content available to a user via an EPG (for example, scheduled TV programmed on a set of channels) and via a VoD service. In alternative embodiments, a variety of other sources of content may be available as well as, or in addition to, EPG and VoD content, for example internet content and/or any suitable streamed content via wired or wireless connection. As discussed further below, recommendation system 2 is able to communicate, either directly or indirectly, and either via wired or wireless connection, with very large numbers of users 205 or user devices 40 and to provide recommendations for or derived from such users 205 or their user devices 40. Other than some PVRs which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device. Although the user devices 40 could belonging to the user 205, they could also comprise any other device that the user 205 is logged into.

The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, creator content, book or article selection interfaces, amongst others. The content may comprise video, audio, text, images, or other data.

In the embodiment of FIG. 1, the UX engine 12, the EPG module 8, the VOD module 10, the recommendation system 2, the User Cache 6, the PVR Communication module 12, the EPG module 8 and the User Learning module 24 are implemented in a server. The server includes communication circuitry that enables communication between the server, or appropriate components of the server, with each of the user devices, and with the content sources, for example, a TV service operator or other content service operator.

It will be understood that requests and results may be communicated between different parts of a network using one or more application programming interfaces (APIs). The API defines the parameters and other data to be included in a request and the form and format of the results from the request. In particular, the content recommendation procedures described in the following are available through one or more APIs.

Any other suitable implementation of the EPG module 8, the VOD module 10, the recommendation system 2, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments, any one of the components as described in relation to the embodiment of FIG. 1 or other embodiments may be combined with any other one(s) of the components, or any one of the components may be split into multiple components providing the same or similar functionality.

The EPG module 8 and the VOD module 10 obtain information concerning available content from the content sources, for example, a TV service operator or other content service operator. The content information comprises metadata of content, for example, television programme metadata. The metadata may be representative of a variety of different content parameters or properties, for example but not limited to programme title, time, duration, content type, programme categorization, actor names, genre, release date, episode number, series number. It is a feature of the embodiment that the metadata stored at the EPG module 8 and the VOD module 10 may also be enriched with additional metadata, for example by the operator of the system, such that additional metadata to that provided by the content sources or other external sources may be stored. The content information also include synopses and other descriptive data for content items.

In the embodiment of FIG. 1 the system operates together with three sources of content for a user device: real-time linear television, for example terrestrial or satellite broadcast television; one or more video-on-demand (VOD) services, and pre-recorded video content stored on one or more personal video recorders (PVR). In alternative embodiments, further sources of content as well as or instead of those shown may be used.

The operation of the digital content recommendation system is controlled by the recommendation system 2. As can be seen in FIG. 1, the recommendation system 2 is configured to communicate with the one or more content information modules: the electronic programme guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the recommendation system 2.

As discussed in more detail below, the user profile module 26 is operable to use first party data obtained by an operator of the system to determine user activity profiles of individual users 205 or sets of users 205, that are representative of actions of a user 205 with respect to content selection interfaces. The content recommendation engine (CRE) 22 can apply a set of processes to determine, in real time, content recommendations for a user 205 based on user data and available content.

The recommendation system 2 has a content recommendation engine (CRE) 22, item based procedure executing module 26 and a user learning module 24. The CRE 22 can apply a set of processes or procedures to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalized recommendations for the user.

The UX engine 12 allows for the content selection interface to be configured, which may be at least in part responsive to input from an operative, such as an operative of a content provider service, and/or at least in part automatically, or any combination thereof.

The UX engine 12 allows groups of content to be created. The user content selection interface presents the content items for selection by the user 205 in the groups of content. In an example, each group of content may correspond to a different carousel in a carousel type user interface, but the present disclosure is not limited to this. In some examples, at least one or each group of content may represent a different theme, such as war movies, romances, action movies, nature programs, news and current affairs, and the like. However, this need not be the case, and at least one or each group could be simply selected by the operative or another party. The UX engine 12 also allows the way in which the groups of content are provided or displayed to the user 205 to be customized to that individual user 205 or group of users 205. For example, the UX engine 12 allows customization, e.g. automated customization, of the order in which groups of content are provided to the user in the user content selection interface, which may be an order in which the carousels corresponding to different groups are provided in the content selection interface. In some examples, this comprises allowing selected groups of content to be fixed in a set place in an ordering of the groups of content. In examples, this comprises allowing the UX engine 12 to determine a customized ordering of at least some or all of the groups of content for each user 205 or group of users 205, which may be based at least in part on groups of content that the user 205 or group of users 205 have previously interacted with in some way, e.g. whilst using a user content selection interface.

The ordering of the groups of content (and content recommendations in examples in which the UX engine 12 is part of a recommendation system 2) can be based on user actions, wherein at least some of those user actions include user interaction with content recommendation user interfaces. FIG. 1 shows user actions and requests for recommendations or ordering of content being communicated directly to the recommendation system 2 from the user devices 40. In addition to receiving requests for recommendations of content or ordering of groups of content, the recommendation system 2 is configured to log user activity. By logging user activity and storing activity over an extended period of time, the recommendation system 2 and the hard disk storage 4 can build up an overall picture of the actions of a plurality of users relating to their interactions with content selection interfaces. User actions are turned into learn actions by the user learning module 24 to be processed by the user profile module 26, the UX engine 12 and the content recommendation engine 22.

FIG. 1 shows a user action being received by the recommendation system 2. In addition to receiving requests for recommendation, the recommendation system 2 is configured to log user activity. By logging user activity and storing activity over an extended period of time, the recommendation system 2 and the hard disk storage 4 can build up an overall picture of the viewing activities, habits and preferences of a plurality of users. User actions are turned into learn actions by the user learning module 24 to be processed the content recommendation engine 22.

FIG. 1 also has a further metadata source. In the present embodiment, this is provided on a remote computer, accessible, for example, via the cloud 215. It will be understood that the further metadata source is provided remotely from the content recommendation system and, for example, data sources 8 and 10.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user 205 may be a viewer of the user device. Alternatively or additionally, the user 205 may be a subscriber and/or customer of a service accessible through the user device.

The user cache 6 is coupled to the item based recommendation procedure module 26 and the content recommendations engine 22, and the UX engine 12 and data stored by the user cache 6 may be used by the item based recommendation procedure module 26 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2. The hard disk storage 4 is configured to store one or more databases. Entries from the databases on the hard disk storage resource 4 can be retrieved by requests made through a data access layer. Entries in the databases may also be updated via the data access layer. The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1, the tables may include various user learning tables that include data representing user 205 actions, also referred to as user activity, relating to content selection interfaces. on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

For example, if a user 205 selects a programme or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, programme identifier, which group of content the content belongs, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 it can be understood that a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favorite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of individuals associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call center, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content item and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: PV1, PV2, . . . , PVn. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of PVR1 and user of PVR2 may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments, the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20*a*, 20*b*, . . . 20*z* and the recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments, any other data stores, for instance local storage devices, for example any storage devices included in or associated with user devices, may be used as well as or instead of PVRs. In some embodiments, the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

As part of a session, the content recommendation engine is configured to offer a number of operations to be called using an API. As an example, the content recommendation engine is configured to offer to content recommendation request A user 205 watching a television programme that they have selected on user device 40. Data representing the user's activity is sent to the recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user. The user record may also be referred to as a user profile.

As a non-limiting example, a user record or user profile may include information that a user has played an episode of Game of Thrones on 14 Jul. 2022, has downloaded an episode of The Simpsons on 15 Jul. 2022, and has just watched an episode of Top Gear on 15 Jul. 2022. The user record will also include metadata associated with each item of content in the record. For example, the meta data items cars, supercars and engineering are associated with the Top Gear episode. In practice there will be many more items of meta data associated with each item of content. In general, a user record will include records of far larger numbers of items of content. However, such a small number of items content might be found for a new user or for a temporary user of a system. For example in some embodiments, the system may be used for a user who is a guest in a hotel or traveler in a vehicle or transport system.

The user data in respect of the user is sent to the content recommendation engine 22 (of the content recommendation system 2) in order to generate or update a user profile for the user 50.

The content recommendation module 22 in this embodiment then performs a search of various data sources, for example in the cloud, to determine any other information concerning the item of content. The data sources can include EPG module, VoD module and other data sources. For example, various databases can be consulted that include additional information concerning television programmes or other items of content.

In the present embodiment, the record for the item of content and any other information found from the search of data sources is subject to processing to match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>:<keyword>. Features describe the content and include subjects, settings, themes and characters (for example, Wimbledon may contain the terms-subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata for the item of content is then stored in the user record or user profile in the user profile table 30 in the hard disk storage 4.

As described above, each user has a stored user record or user profile. The system is configured to provide a plurality of content recommendation candidates to a user based on the similarity between the user record and the content metadata.

Operation of the system of FIG. 1 is described in the following. As a first stage, the user 205 initializes a viewing session through a first initiation event. An initiation event can, for example, be a user logging on to a service provider or turning on the user device 40. The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes. The initiation event may be treated automatically by the content recommendations module as being a request for recommendations for the user.

In response to the initiation event, the user is then presented, via a display of the user device 40, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information as part of a content recommendation process.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation (s) may be transmitted in any suitable fashion either to the user device, or to the database, server or other device. In the present embodiment, software installed at the user device 40 determines whether or how the content item recommendation are displayed on the user interface.

It can be understood that the time constraints on providing content recommendations can be significant, given that personalized content recommendations may need to be generated on the fly, particularly as it may be necessary to provide personalized content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

At the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a pre-determined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

There is description above concerning metadata or other content information that may be used by the CRE 22 in providing content recommendation. The content information can contain scheduling information (e.g. start and end times for programmes, series information) together with content information regarding the programme itself (e.g. programme description, age rating information). In some embodiments, metadata items may be mapped from an ontology (e.g. the ontology of 38,000 items) to other metadata items in the ontology. Weightings or confidence scores are associated with the mappings in some embodiments. The ontology represents a pre-determined set of properties and/or parameters. The content metadata for content items (or as collected in user data) corresponds to properties and/or parameters selected or assigned weights and/or values from this pre-determined set. The at least one property of the piece of content may comprise a set of tags or other metadata representing properties of an item of content. In the system, the metadata is stored on hard disk storage in metadata table 33.

As part of a content recommendation session, a number of different types of recommendation procedures may be available to be requested. These include procedures, for example based on a weighting, scoring and/or matching process generated based on previous user actions, and matching to available content. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation procedures may be more sophisticated and, may be for example based on similarities or cross-correlations between different content parameters and user actions and properties based on large amounts of historical data. At least one of the recommendation procedures may use a machine learning derived model to determine recommendation candidates. As a non-limiting example, machine learning techniques such as clustering algorithms for clustering objects that share similarities, such as K-means clustering or neural network based techniques and/or Kohonen based techniques may be suitable.

The content metadata may correspond to values for one or more properties or parameters or characteristics, such as programme title, time, duration, content type, programme categorization, actor names, genre, release data, episode number, series number, style, mood, language and theme. The properties or parameters or characteristic may include one or more of the following: Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer. These properties or parameters will be understood as a non-exhaustive and non-limiting list. The metadata is represented by metadata items having a value for such properties or parameters. The collected metadata can be considered as representative of user interests and/or preferences based on previous interactions with the content. The metadata items may be provided together with a score so that the metadata represents a degree of the preference or interest for that content property or parameter. The content metadata stored in the user profile may be referred to as user profile features. Content metadata attributes may also be referred to as facets. The following, non-limiting and non-exhaustive list of facets is provided: Actor; Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer. It will be understood that in addition to facets, a number of other categories of content attributes may be used. For example, the desired context may be defined, at least in part, by descriptive content metadata or alternative content characteristics, such as, running time, language, format, age rating. In general, any property or parameter or characteristic capable of distinguishing a sub group of available content from other available content can be used as a content attribute or content metadata. For example, metadata categories as described above or other content information may be suitable. It will be understood that a context can correspond or represented by combination of context attributes. In some embodiments, the context may be associated with at least some of the content that is currently being displayed to a user via the user device.

FIG. 3 describes a method of generating a synopsis for a content item. At step 302, a content selection session commences. In the embodiment of FIG. 3, as part of the content selection session an interactive content selection interface is displayed on user device 40, for example, an electronic program guide. The interface includes a number of interactive graphical elements allowing a user to navigate the content for viewing. The user navigates the interactive content selection interface to browse content items. A number of the content items may be displayed via the content selection interface in response to a request sent to the content recommendation system.

At step 304, a user performs a pre-selection action in connection with a content item. The pre-selection user interaction may include one or more of selecting content from a group of content or a related group of content; scrolling through content in a group of content or a related group of content; hovering a cursor for greater than a threshold period over a group of content or a related group of content; and/or pausing scrolling for greater than a threshold period through groups of content whilst a group of content or a related group of content is displayed on a user interface; clicking on or otherwise selecting content that is in a group of content or related group of content from a list of search results; interacting with other content in the group of content items; The pre-selection user interaction comprises a user interaction representing a selection of a group of the plurality of groups of content and wherein the method comprises generating the synopsis for each content item of a group of content items in response to a user interaction with said group in the user selection interface.

The pre-selection action could be, for example, this could be selecting a piece of content by clicking on the poster image in a carousel and then they are taken to a screen where the synopsis and other details about the show are displayed.

At step 306, the user profile for the user is retrieved. The user profile module is obtained by the user profile module. The user profile module is configured to generate a user profile based on the user activity recorded in the user record. In the present embodiments, the user profile may be represented as a feature vector or other suitable mathematical representation. Each entry of the feature vector represents a metadata item and an associated weighting.

At step 308, content information is obtained for the content item. The content information may comprise content metadata is retrieved together with the user profile. The content information may include enriched metadata about the content item. In some embodiments, the method may include enriching, correcting or supplementing initial metadata.

At step 310, the processor generates or otherwise obtains a synopsis for the user based. The synopsis may be generated and/or obtained based on user data and/or associated metadata. Steps 306, 308 and 310 are described in further detail with reference to an embodiment in FIG. 4.

At step 312, the generated synopsis is displayed to the user 205 via the user device 40.

It will be understood that, in some embodiments, steps 304, 306 and 308 are combined in that a user is not required to manually request the synopsis. In such embodiments, the synopsis is generated in response to the pre-selection action.

In further embodiments, an initial synopsis is retrieved, for example, as part of the content information, and a request for a customized synopsis is made with or without the initial synopsis being displayed to a user. In a further embodiment, the request for the synopsis is made manually. In some embodiments, an initial synopsis is displayed to the user via the user device 40 in response to a pre-selection action. A user then makes a request for a further, customized synopsis. In the present embodiment, the user requests a personal synopsis by selecting a request button or otherwise interacting with a user interface. A further synopsis is then generated and displayed to the user via the user device 40.

Figure 4:
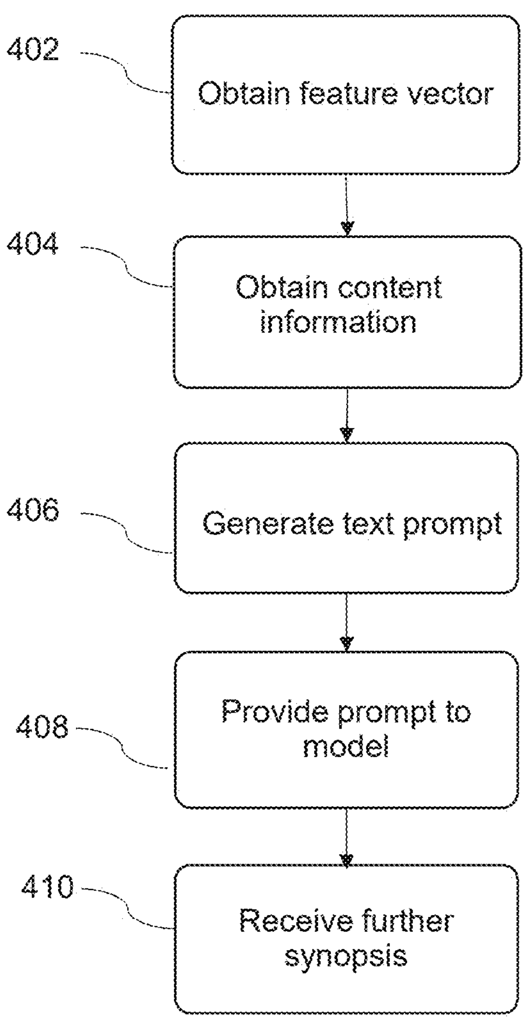
FIG. 4 is an overview of a method of generating descriptive metadata, in particular, a synopsis, for a user in accordance with an embodiment.

FIG. 4 depicts a method for generating a synopsis, in accordance with an embodiment, for a content item. The method can be incorporated into a workflow such as that of FIG. 3. In the embodiment of FIG. 4, the generation of a synopsis is based on content information obtained for the content obtained from the sources of content, for example, the EPG module 8, the VoD module 10 or other data sources. The generation of the synopsis is also based on user data, for example, the user record or user activity profile generated by user profile module 26.

The method of FIG. 4 can be incorporated into a workflow, for example a content recommendation workflow performed by content recommendation engine. In such an embodiment, a request for one or more content recommendations, for example, via the user input device. In response, the CRE obtains third party content information from EPG module, and VoD module and other data source. The CRE obtains a user profile for a user and performs one or more content recommendation procedure to return a set of content recommendation candidates. As part of such the procedure, a synopsis is generated for each of the content items, substantially as described with reference to FIG. 4. The generation of the personalized synopsis will be separate from the generation of recommendations in some embodiments.

In some embodiments, the synopsis for each recommended content item is generated and stored at a first time during the content recommendation process. As an example, a synopsis may be generated for each content item of a set of content recommendation results. In some embodiments, the synopsis for the content items are stored for display at a later time. In an example, the synopsis for each content item is stored while a user interacts with the content selection interface and each synopsis is displayed in turn as a user performs a pre-selection interaction with the content item. In some embodiments, a batch of synopses are generated for a group of content items that comprise a group of recommendation candidates.

At step 402, a feature vector is obtained, for example, generated by the user profile module or from the user profile table 30. The feature vector represents user data for a user. In particular, the feature vector is based on or forms part of a user profile that is determined using content engagement data. The feature vector may be obtained or generated by user profile module 26. The user profile and feature vector correspond to first party data in that the user profile is based on user activity and other engagement data for the user.

At step 404, content information for the content is obtained. In the present embodiments, the content information is in the form of stored content metadata. The content information may be obtained from content metadata source, such as the EPG module 8, the VOD module 10 or other data sources 14. The content information may comprise or be considered as part of third party content metadata.

At step 406, the prompt generator processes the obtained user profile and the content information to generate a prompt. In the present embodiment, the generation of the prompt includes the steps of processing the feature vector. For example, the vector data is processed to obtain a subset of categories and/or properties. Step 504 may include one or more filtering steps to filter the feature vector to select a subset of features. Processing of the feature vector may be alternatively performed at step 402, when obtaining the feature vector. For example, the feature vector may be filtered and the prompt is based on the filtered feature vector and the content information.

The prompt is formed in a suitable input format for the generative language model. In the present embodiment, the prompt is a text string. As a non-limiting example, the prompt is in a human readable format, and is of the format "Generate synopsis X for content item Y for a user that is interested in A, B and C". In such a non-limiting example, X is replaced by the text string of the initial synopsis obtained for the content item Y and A, B and C represented three features selected from the user feature vector based on their associated weights.

As a non-limiting example, the prompt is in a human readable format, and is of the format, "Regenerate synopsis X for content item Y for a user that is interested in A, B and C", where X is replaced by the text string of the initial synopsis obtained for the content item Y and A, B and C represented three features selected from the user feature vector based on their associated weights.

The number of features selected from the user feature vector may be selected based on a number of factors, such as, user input, current network performance. Current network performance may be monitored and measured, for example, by the CRE.

It will be understood that the user profile includes categories such as genres, moods, themes, subjects, actors, etc. that the person likes. And, for example, other information such as languages.

At step 408, the generated prompt is passed as an input a machine learning derived model. It will be understood that, in the system of FIG. 1, the generative language model is accessible via a dedicated API (corresponding to model interface 58) and is provided on one or more further computing resources, for example, remote model server 54.

At step 408, the generated prompt is packaged in a request for the model. The request is in a suitable format for the model. Step 408 includes setting values for model parameters for the request. The parameters will depend on the generative model used. For example, the parameters may include version or subversion of the model desired, maximum number of token for the reply. After creating a request, the request is sent to the remote server.

The request may be further tailored or based on additional user input. For example, a user may manually request a more detailed description and, as such, the number of tokens requested or the number of features of prompt the request may be modified accordingly.

At step 410, a synopsis is generated by the model on the remote server 11 based on the prompt and returned. Step 410 may include an authentication process with the remote server 54.

As described with reference to FIG. 3, the generated synopsis is then displayed to the user via the content selection interface. The content selection interface is controlled by the UX engine 12.

In the embodiment of FIG. 3, a synopsis is generated for each user in response to a user action with a content selection interface. In particular, in the embodiment of FIG. 3, it will be understood that the synopsis is generated on the fly, for example, as described with reference to FIG. 3 depicts a method of generating a synopsis. It will be understood that the synopsis may be provided to a user using a different interface than the one described with reference to FIG. 3.

For example, in some embodiments, in place of the content selection interface described above, a user may interface with the content recommendation system via a conversational chat interface. In such embodiments, the system may provide an additional interface between the user and the generative model server allowing control of the data being provided to the generative model server.

The following non-limiting examples of synopsis are provided. As an example, viewer A has previously watched "Black Summer", "Kingdom", "Sweet Tooth", "The Leftovers". As part of a content recommendation session the user may be recommended "The Walking Dead". Alternatively, the user may find the content independently, for example, through a search function.

The input to the model is a prompt based on the user data. The output from the model is a personalized synopsis: "The Walking Dead, like the other shows you have watched, is a post-apocalyptic drama. It follows a group of survivors as they struggle to survive in a world overrun by zombies. The show also explores themes of survival, morality and the human condition. All the shows you have watched have a similar focus on the human experience in a world that has drastically changed".

As a second example, viewer B has previously watched "Hairy Bikers", "Jamie Oliver Together", and "Top Chef". The viewer is recommended "Gordon Ramsay's Kitchen Nightmares". The standard synopsis is "British reality series in which world-renowned chef Gordon Ramsay visits struggling restaurants in an effort to help them succeed".

The input to the model is a prompt based on the user data. The output from the model is a personalized synopsis: Ramsay's Kitchen Nightmares is similar to the other shows you have watched in that it focuses on food and cooking. However, the main difference is that Ramsay's Kitchen Nightmares focuses on helping struggling restaurants and chefs improve their businesses. The show follows Gordon Ramsay as he visits restaurants and helps them to improve their menus, service, and overall atmosphere. The show also features Ramsay's signature fiery temper and no-nonsense attitude, which makes it an entertaining watch.

As a third example, viewer C has previously watched "Antiques Roadshow" and "Grand Designs". The viewer is recommended "Escape to the Country". The standard synopsis is: A series which helps prospective buyers find their dream home in the country.

The personalized synopsis is "Escape to the Country is a show that follows people as they search for their dream home in the countryside. It has a lot in common with Antiques Roadshow and Grand Designs in that it focuses on people's dreams and aspirations, and the journey they take to achieve them. It also has a strong focus on the beauty of the countryside and the unique properties that can be found there. All three shows also feature experts who offer advice and guidance to the participants."

The request for a synopsis will include variable parameters that can be selected. In some embodiments, the model itself may be trained to generate a synopsis having certain characteristics. In some embodiments, the synopsis is generated based on a constraint of one or more pieces of hardware in the system. In one example, the generation of the synopsis is based on one or more constrains of the user device, for example, the size of the display. The request may include user device information, for example, the size of the display, to ensure the generated synopsis can be displayed in full on the display. In some embodiments, a constraint is applied either as part of the model or, for example, following synopsis generation, to apply a limit to the length of synopsis generated. The method may include obtaining the user device information for the user device and generating the prompt using the user device information. As a further example, the parameter may be an output language.

In some embodiments, the prompt include examples of synopses.

It will be understood that the content recommendation system processes content recommendation requests for large number of users, in real time. In some embodiments, the further data module, manages requests made to the model server. The system is capable to scaling to very large numbers of requests.

In the above described embodiments a synopsis is generated based for each user to provide the user with a customized synopsis. In some embodiments, the method is as described with reference to FIG. 3, but in place of step 306, 308 and 310, the synopsis is obtained from a store of pre-determined synopses.

It will be understood that the real-time generation of the synopsis is provided by the above-described methods. For example, a user profile may change and the synopsis may be generated following such a change.

In such an embodiment, in place of generating a synopsis for each content item and/or user, in real time, a synopsis from a set of pre-determined set of synopses may be selected based on the user data. For example, for a particular content item, a set of pre-determined synopses may be stored and available for selection, and the selection is performed based on the user data. The synopses may be stored, for example, on hard disk storage 4, in synopsis table 59.

In some embodiments, the pre-determined synopses are generated by aggregating user data for an identified group of users and using the aggregated data to generate a synopsis in place of a single user's data. The user data, in particular, the user profiles, of the segment of users is aggregated to form an aggregated user data set and the aggregated user data set is used to generate a prompt in place of the user profile, as described with reference to FIG. 4. In such embodiments, following generation of the set of synopses, the method may include generating a customized synopsis for a further user by selecting one of the pre-generated synopses. In such an embodiment, a matching process is performed between the further user data and the set of synopses. The matching may include processing the synopsis to extract information or matching the further user data to data stored with the pre-generated synopses.

In some embodiments, generating a synopsis steps using a machine learning model and retrieving synopsis are selectively combined. In some embodiments the selection of generation or retrieving can be based on factors such as a level of matching between the user data and the stored synopsis. For example, if none of the stored synopses match the user data to a desired degree then a customized synopsis is generated by machine learning.

Although a particular system arrangement is shown in FIG. 1, there are various system arrangements that could be used.

Figure 5:
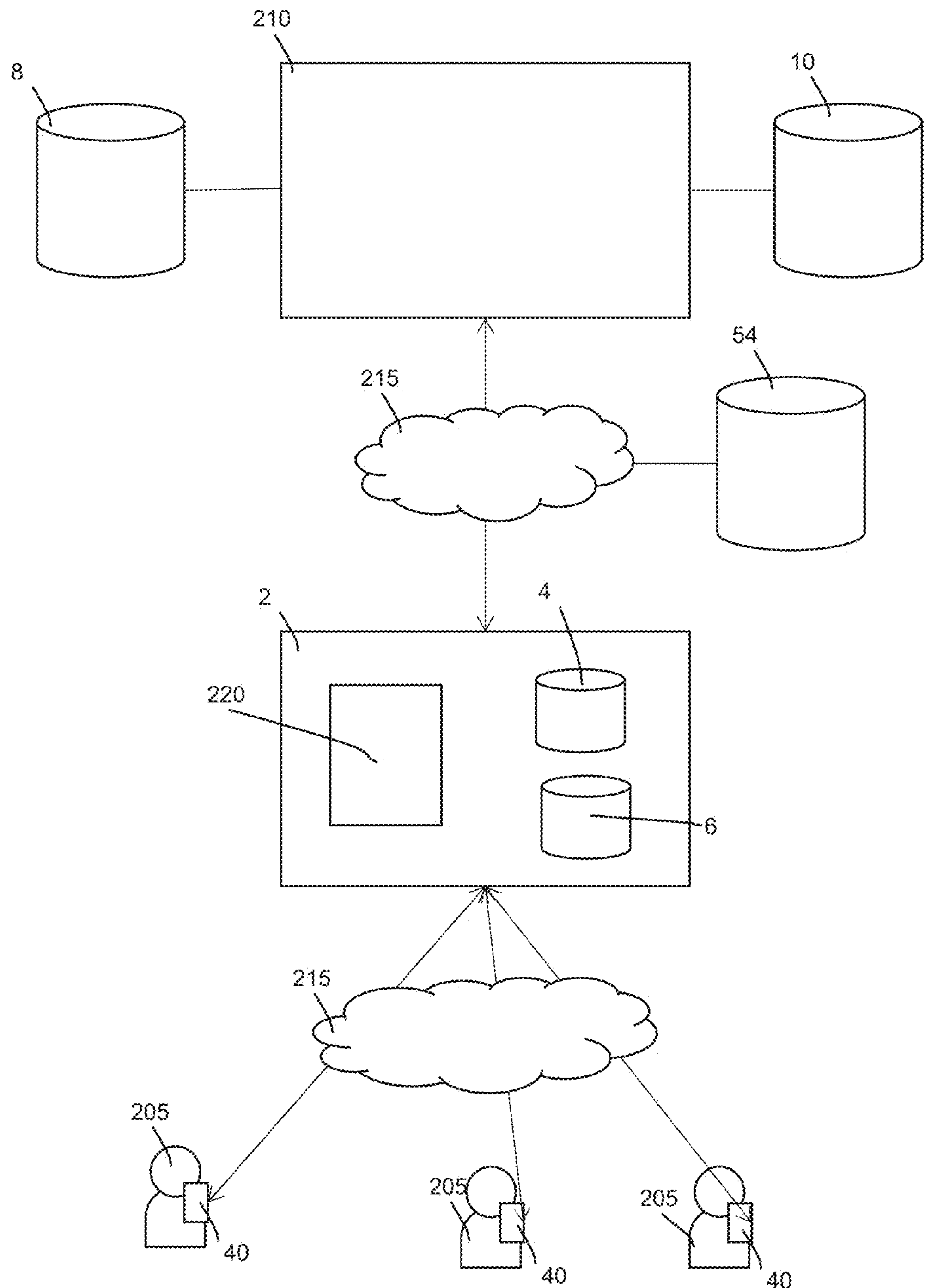
FIG. 5 is a schematic of a system arrangement.

FIG. 5 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40. Access between recommendation system 2 and the model server 54 is provided via a network such as the cloud 215.

Figure 6:
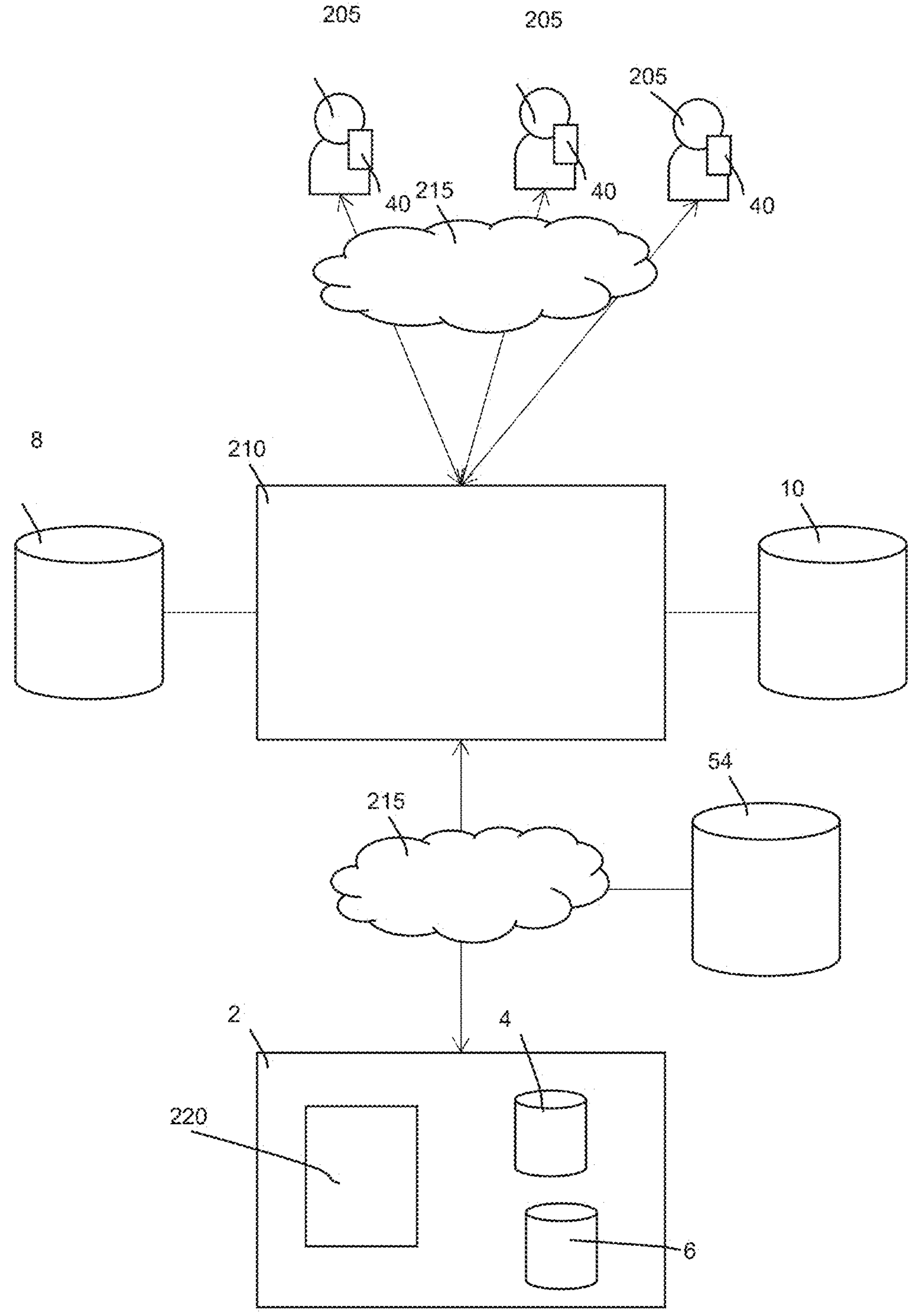
FIG. 6 is a schematic of an alternative system arrangement to that of FIG. 5.

FIG. 6 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205. Access between recommendation system 2 and the model server 54 is provided via a network such as the cloud 215.

The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the use cache 6 when needed by the processing resource 220.

The system described herein can be used to provide a content selection method and system that may in some examples allow a user to more quickly identify content of interest and to better navigate content available from a content provider system.

Although various specific examples have been described above, these are provided to help understanding of the present disclosure and other possible implementations can be used. For example, although specific arrangements of systems and networks that could be used to implement the concepts disclosed herein are shown in FIGS. 1 to 4, other systems architectures could be used. For example, the UX engine 12 could be provided as a stand-alone system rather than being integrated with the content recommendation engine 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

The above embodiments describes collection of user data. It will be understood that in some embodiments, the system may be configured such to restrict or not allow access to personal information, or data that could be used to determine the name of a user, or demographic information concerning the user.

As such, the above description of specific embodiments is made by way of example only. A skilled person will appreciate that variations of the described embodiments may be made without departing from the scope of the invention.

What is claimed is:

1. A computer-implemented method for generating a synopsis for a content item comprising:

obtaining user data for at least one user, wherein the user data is based on user activity for the at least one user and represents user engagement with content available through a content distribution system;

receiving a request for one or more content recommendations;

generating a content recommendation for a set of content items based on at least content information for the set of content items and the obtained user data, wherein the set of content items comprises content recommendation candidates;

receiving at least one of content metadata and other content information for a content item of the set of content items;

providing a request for a synopsis to a generative text or language model based on the received at least one of content metadata and other content information and the obtained user data;

transmitting the request to a model server hosting the generative text or language model via a communication interface; and generating by the generative text or language model on the model server a synopsis text for the content item based on the request.

2. The method of claim 1, wherein the generated synopsis comprises a customized synopsis for said at least one user.

3. The method of claim 1, wherein the content metadata comprises enriched content metadata.

4. The method of claim 1 further comprises:

receiving a call request, for example, in accordance with application programming interface protocol for a synopsis based on the content metadata and user data;

transmitting the API call to a server or further networked processor;

generating the synopsis based on the API call.

5. The method of claim 1, wherein the content information comprises an initial synopsis for the content item and wherein generating the synopsis comprises at least one of modifying and re-generating the initial synopsis based on at least one of the obtained user data and the received content metadata.

6. The method of claim 1, wherein the generating of the synopsis text is performed for each content item of the set of content items.

7. The method of claim 1, wherein the synopsis is generated and stored at a first time during or in response to a content recommendation request and retrieved from storage at a second time in response to a user interaction with a content selection interface or other user interface.

8. The method of claim 1 wherein generating the synopsis comprises applying a machine learning derived model to at least part of the content metadata, and at least part of the user data wherein the machine learning model is configured to output the synopsis.

9. The method of claim 8, wherein the machine learning derived model is applied to an initial synopsis.

10. The method of claim 8, further comprising selecting one or more parameters for the model, wherein the one or more parameters comprises at least one of: requested language, length of desired synopsis.

11. The method of claim 1 further comprising obtaining user device information information relating to the size of a display or a display window, and generating the synopsis based on said user device information.

12. The method of claim 1 wherein the at least one of user data and associated metadata is represented as a feature vector or other data structure and wherein the method comprises generating a prompt or other input for a model based on said feature vector or other data structure and said content metadata.

13. The method of claim 12, wherein the prompt is based on an initial synopsis.

14. The method of claim 1 wherein generating the synopsis comprises packaging at least part of said at least one user data and associated content metadata, said content metadata and one or more selected parameters for a synopsis generator.

15. The method of claim 1 wherein the method comprises performing at least one of a filtering and selection process on the at least one of user data and associated metadata and wherein the generating of the synopsis is based on the at least one of filtered and selected at least one of user data and associated metadata.

16. The method of claim 1 wherein at least one of a), b): a) the content metadata is obtained from a first data source without the use of at least one of user data and associated metadata; b) wherein the synopsis is generated based on an initial synopsis that is independent of user activity.

17. The method of claim 1 wherein generating or otherwise obtaining the synopsis comprises evaluating a set of pre-generated synopses for a suitable or closest match based on said at least one of user data and associated metadata.

18. The method of claim 17, wherein the generating or obtaining the synopsis comprises:

at least one of a), b): a) retrieving said suitable or closest match based on said evaluation; b) generating a synopsis in the absence of a suitable or closest match.

19. The method of claim 1, wherein the method comprises at least one of a), b):

a) identifying a group of users for at least one user from a plurality of groups based on said user data and wherein the generation of the synopsis comprises is based on said identification of group;

b) obtaining first party metadata from a first source and obtaining at least one of user data and associated content metadata from a second source.

20. The method of claim 1, wherein the method further comprises displaying the generated synopsis as part of a content selection interface or other user interface.

21. A system comprising processing circuitry configured to:

obtain user data for at least one user, wherein the user data is based on user activity for the at least one user and represents user engagement with content available through a content distribution system;

receive a request for one or more content recommendations;

generate a content recommendation for a set of content items based on at least content information for the set of content items and the obtained user data, wherein the set of content items comprises content recommendation candidates;

receive at least one of content metadata and other content information for a content item of the set of content items;

provide a request for a synopsis to a generative text or language model based on the received at least one of content metadata and other content information and the obtained user data;

transmit the request to a model server hosting the generative text or language model via a communication interface; and generate by the generative text or language model on the model server a synopsis text for the content item based on the request.

22. A non-transitory computer-readable medium that comprises computer-readable instructions that are executable to:

obtain user data for at least one user, wherein the user data is based on user activity for the at least one user and represents user engagement with content available through a content distribution system;

receive a request for one or more content recommendations;

generate a content recommendation for a set of content items based on at least content information for the set of content items and the obtained user data, wherein the set of content items comprises content recommendation candidates;

receive at least one of content metadata and other content information for a content item of the set of content items;

provide a request for a synopsis to a generative text or language model based on the received at least one of content metadata and other content information and the obtained user data;

transmit the request to a model server hosting the generative text or language model via a communication interface; and generate by the generative text or language model on the model server a synopsis text for the content item based on the request.

* * * * *